United States Patent [19]
Chiu et al.

[11] Patent Number: 6,134,599
[45] Date of Patent: Oct. 17, 2000

[54] SYSTEM AND METHOD FOR ORGANIZING DEVICES IN A NETWORK INTO A TREE USING SUITABILITY VALUES

[75] Inventors: Dah Ming Chiu, Acton; Miriam Kadansky, Westford; Radia J. Perlman, Acton, all of Mass.

[73] Assignee: Sun Microsystems, Inc., Palo Alto, Calif.

[21] Appl. No.: 09/061,849

[22] Filed: Apr. 18, 1998

[51] Int. Cl.[7] .............................. G06F 15/16; H04L 12/28
[52] U.S. Cl. .......................... 709/252; 709/249; 370/408
[58] Field of Search ................................... 709/252, 249; 370/408

[56] References Cited

U.S. PATENT DOCUMENTS

| | | | |
|---|---|---|---|
| 4,864,559 | 9/1989 | Perlman .................................... | 370/256 |
| 5,355,371 | 10/1994 | Auerbach et al. ........................ | 370/255 |
| 5,684,961 | 11/1997 | Cidon ....................................... | 709/243 |
| 5,805,578 | 9/1998 | Stripe et al. .............................. | 370/255 |

*Primary Examiner*—Krisna Lim

*Attorney, Agent, or Firm*—Richard A. Jordan

[57] ABSTRACT

In a digital data network, a plurality of devices interconnected by a communication link organize themselves into a tree structure. Each of the devices has an associated suitability value that generally relates to the device's suitability for becoming a node in the tree structure. The devices organize themselves into a tree structure in one or more iterations, each iteration comprising two general steps, namely, a node election step and a tree establishment step. In the node election step, the devices whose suitability values are such that they can become nodes in the tree broadcast over the communication link node election messages including their respective suitability values. These devices also receive the node election messages that are broadcast by other devices. Each device determines whether it is elected a node in the tree structure in connection with a comparison between its suitability value and suitability values of node election messages received thereby. During the tree establishment step, the devices in the network communicate with at least one of the device or devices which is or are elected respective nodes in the tree structure to facilitate becoming respective children thereof.

42 Claims, 10 Drawing Sheets

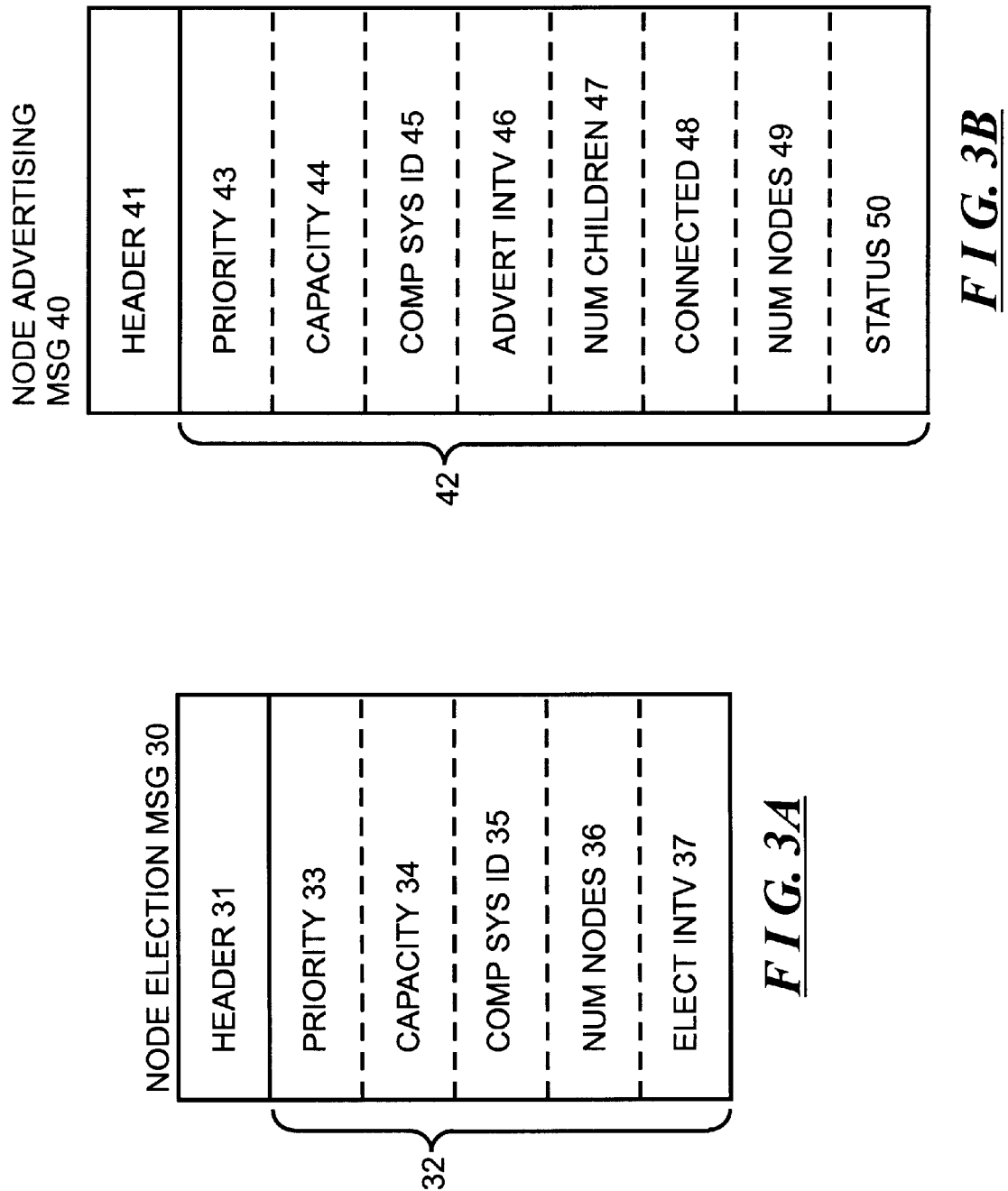

SYSTEM AND METHOD FOR ORGANIZING DEVICES IN A NETWORK INTO A TREE USING SUITABILITY VALUES

FIELD OF THE INVENTION

The invention relates generally to the field of digital networks and more particularly provides an efficient arrangement for establishing a multicast message delivery error recovery tree in a digital network.

BACKGROUND OF THE INVENTION

In modern "enterprise" digital data processing systems for use in an office environment in a company, a number of personal computers, workstations, and other various network resources such as mass storage subsystems, network printers and interfaces to the public telephony system, are typically interconnected in a computer network. The personal computers and workstations are used by individual users to perform processing in connection with data and programs that may be stored in the network mass storage subsystems. In such an arrangement, the personal computers/workstations, operating as clients, download the information, including data and programs, from the network mass storage subsystems for processing. In addition, the personal computers or workstations will enable processed data to be uploaded to the network mass storage subsystems for storage, to a network printer for printing, to the telephony interface for transmission over the public telephony system, or the like. In such an arrangement, the network mass storage subsystems, network printers and telephony interfaces operate as shared resources, since they are available to service requests from all of the clients in the network. By organizing the network in such a manner, the servers are readily available for use by all of the personal computers/workstations in the network. Networks may be spread over a fairly wide area, and may interconnect personal computers, workstations and other devices among a number of companies and individuals.

Computers and other resources (generally, "devices") in a network share information by transferring messages thereamong. Messages can be categorized into two general classes, namely, unicast messages and multicast messages. A unicast message is used by a device to transfer information to one other device in the network, whereas a multicast messages is used by a device to transfer information to all of the devices, or a selected subset of the devices, in the network. Each unicast message includes address information, including a source address, which identifies the particular device that transmitted the message, and a destination address, which identifies the particular device that is to receive the message in the case of a unicast message. Similarly, each multicast message includes address information, including a source address, which identified the particular device that transmitted the message, and a destination address that identifies a set of devices (which may be either all of the devices or a selected subset) that are to receive the message in the case of a multicast message. When a particular device determines that a unicast message contains a destination address that identifies it (that is, the particular device), or that a multicast message contains a destination address that identifies a set of devices that includes the particular device, it (that is, the particular device) will receive and process the message.

Although networks generally transfer messages reliably, sometimes messages are lost and not received by the destination devices, that is, the particular devices that are intended to receive them. If a destination device fails to receive a message, it can transmit a "negative acknowledgment" ("NACK") message to the source device, that is, the device that generated and transmitted the message over the network, requesting retransmission of the message. Typically, unicast messages transmitted by a particular source device to a particular destination device include sequencing information so that, if a destination device determines that there is a gap in the sequence of messages received by it from a particular source device, it can notify the source device to request retransmission. If messages can be delivered to the destination device out of the order in which they are transmitted, the destination device may wait for a period of time after it notices the gap in the sequence to see if the missing messages might be eventually delivered, but, in any case, if the missing message are not delivered to the destination device at least prior to expiration of the period of time, the destination device will generate the "NACK" message and transmit it to the source device to enable retransmission of the missing messages.

A similar operation occurs in connection with multicast messages. That is, if a destination device determines that a multicast message whose destination address identifies a set that includes the destination device, in a sequence of such multicast messages from the same source device, has not been received, it (that is the destination device) will generate a "NACK" message for transmission to the source device requesting retransmission of the message, or at least transmission of the information in the message in a unicast message to the destination device. However, unless failure to receive a multicast message by one destination device is due to a malfunction of that destination device, if one destination device fails to receive a multicast message, frequently a large number or all of destination devices in the destination device set for the multicast message will also fail to receive the multicast message, all of which will generate and transmit "NACK" messages to the source device requesting retransmission of the multicast message. In that case, if there are a large number of destination devices in the device set for the multicast message, the source device may receive and process a large number of such "NACK" messages, which can significantly negatively effect its (that is, the source device's) other processing operations.

SUMMARY OF THE INVENTION

The invention provides a new and improved arrangement for establishing a multicast message delivery error recovery tree in a digital network which may be used to reduce the number of "negative acknowledgment" ("NACK") messages which may be generated for transmission to a particular source device, which generates a multicast message for transmission to a plurality of destination devices, by destination devices if they fail to receive a multicast message generated and transmitted by the source device.

In brief summary, the invention provides a system for, and a method of, logically organizing, in a digital data network comprising a plurality of devices interconnected by a communication link, into a tree structure. Each of the devices has an associated suitability value that generally relates to the device's suitability for becoming a node in the tree structure. The devices organize themselves into a tree structure in one or more iterations, each iteration comprising two general steps, namely, a node election step and a tree establishment step. In the node election step, the devices whose suitability values are such that they can become nodes in the tree broadcast over the communication link node election messages including their respective suitability values. These devices also receive the node election messages that are broadcast by other devices. Each device determines whether it is elected a node in the tree structure in connection with a comparison between its suitability value and suitability values node election messages received thereby. During the tree establishment step, the devices in the network communicate with at least one of the device or devices which is or are elected respective nodes in the tree structure to facilitate becoming respective children thereof.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 3A and 3B depict structures of messages used in establishing a multicast message delivery error recovery tree in connection with the invention;

DETAILED DESCRIPTION OF AN ILLUSTRATIVE EMBODIMENT

Figure 1:
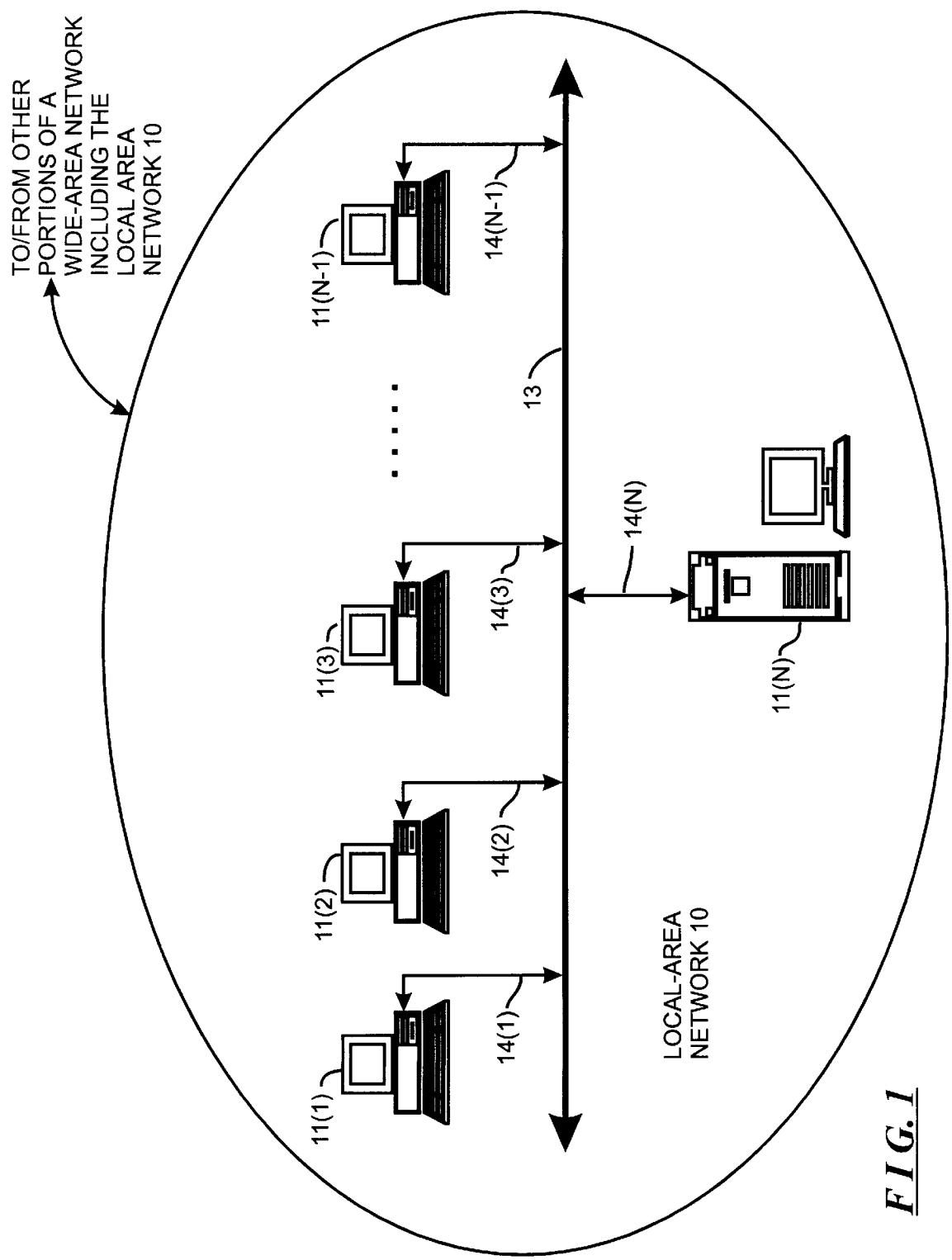
FIG. 1 is a schematic diagram of a local area network including computers which establish and organize a multicast message delivery error recovery tree in accordance with the invention.

FIG. 1 is a schematic diagram of a local area network 10 including an arrangement for generating or constructing a multicast tree in the network, in accordance with the invention. With reference to FIG. 1, local area network 10 includes a plurality of computers 11(1) through 11(N) (generally identified by reference numeral 11($n$)) interconnected by a communication link 13. As is conventional, at least some of the computers 11(1), ... , 1(N-1) are in the form of personal computers or computer workstations, each of which includes a system unit, a video display unit and operator input devices such as a keyboard and mouse. The computer 11(N) also includes a system unit, and may also include a video display unit and operator input devices. The computers 11($n$) are of the conventional stored-program computer architecture. A system unit generally includes processing, memory, mass storage devices such as disk and/or tape storage elements and other elements (not separately shown), including network interface devices represented by respective arrows 14($n$) for interfacing the respective computer to the communication link 13. A video display unit permits the computer to display processed data and processing status to the user, and an operator input device enable the user to input data and control processing by the computer. The computers 11($n$) transfer information, in the form of messages, through their respective network interface devices 14($n$) among each other over the communication link 13.

The communication link 13 interconnecting the computers 11($n$) in the network 10 may, as is conventional, comprise wires, optical fibers or other transmission media, and may further comprise switches, for, respectively, carrying and switching signals representing messages among the computers 11($n$). As noted above, each of the computers 11($n$) typically includes a network interface device 14($n$), which connects the respective computer to the communications link 13. The transmission media and switches comprising communication link 13 may interconnect the computers 11 in any convenient topology.

Information is transferred among the computers 11($n$) in the form of messages. Each message contains a header portion, which generally contains information that is useful in controlling the transfer of the message from the source computer 11($s$), that is, the computer 11($n$) that transmits the message, to the destination computer 11($d$), that is, the computer or computers that is/are to receive the message, and a data portion, which generally contains information that is to be transferred. The information contained in the header portion includes message transfer protocol information, including, inter alia, source and destination addresses that identify the source computer 11($s$) and the destination computer(s) 11($d$) that is/are to receive the message, and each computer 11($n$) can determine from a message's destination address whether it is to receive the message. The destination address information in a message may identify one computer 11($n$) which is to receive the message, in which case the message is referred to as a "unicast" message. On the other hand, the destination address information in a message may comprise a multicast address, which enables all of the computers 11($n$) in the local area network 10 to receive the message; a message which includes such a multicast address is referred to as a "multicast" message or, alternatively, a "broadcast" message. A multicast address may, alternatively, enable various subsets of the computers 11($n$) to receive the message; a message which contains such destination address information will also be referred to as a multicast message. Multicast addresses provide a mechanism by which a source computer 11($s$) can transmit a single multicast message, and enable a plurality of computers 11($n$) to receive the message as destination computers.

The message transfer protocol information that is provided in the header of a message can also include so-called "time to live" ("TTL") information, which can limit the scope of transmission of a message. The time to live information may be used to limit the scope of transmission of a message to, for example, a particular local area network, such as local area network 10, to various groupings of contiguous local area networks in the wide area network, or to the entire wide area network. If, for example, a computer 11($n$) in the local area network 10 transmits a message that contains a multicast address and time to live information indicating that the scope of transmission is limited to the local area network 10, then the message will be received and processed only by the computers 11($n$) in the local area network 10 which are conditioned to respond to that multicast address. Typically, the time to live information is used to control whether gateways (not shown) which are used to interconnect local area networks will transmit a message that they receive on one local area network onto another local area network. In that case, the time to live information is in the form of an integer numerical value, and, when a gateway receives a message, it will decrement the time to live value and, if the decremented time to live value is greater than zero, transmit the message onto the other local area network. On the other hand, if the decremented time to live value is zero, the gateway will not transmit the message received from the one local area network onto the other local area network. Thus, computer 11(n) can limit the scope of transmission of a message to local area network by transmitting a time to live value of "one," in the message.

The local area network 10 schematically depicted in FIG. 1 comprises a part of a wide area network, such as a private wide area network maintained by a particular enterprise and/or a public wide area network such as the Internet. Similar to the local area network 10, the other portions of the wide area network that are not depicted in FIG. 1 generally include local area networks, each including computers interconnected by respective communication links, and the various local area networks are interconnected by various combinations of communication links and switches in a conventional manner. The computers within each local area network can share information by transferring respective unicast or multicast messages in a manner similar to that described above in connection with local area network 10. In addition, a computer in one local area network can share information with computers in other local area networks by transmitting respective unicast or multicast messages in a manner similar to that described above in connection with local area network 10.

The invention provides an arrangement for facilitating the logical organization of at least some of the computers 11(n) in the network 10 into a multicast message delivery error recovery tree. Generally, a multicast message delivery error recovery tree is used to provide for efficient error recovery in the event that one or more computers in the network (which may comprise either the local area network 10 or a wide area network including local area network 10) fail to receive a multicast message transmitted by a source computer 11(s). Typically, if a computer 11(n) is to be a destination computer 11(d) to receive a message that is transmitted by a source computer 11(s), and if the destination computer 11(d) fails to receive the message, it will generate a "negative acknowledgment" ("NACK") message for transmission to the source computer 11(s) to enable the source computer 11(s) to retransmit the message to the destination computer 11(d). This may be repeated several times until the destination computer 11(d) actually receives the message. A destination computer 11(d) can, for example, use message sequencing information that is generally provided in the protocol information in the headers of respective messages in a sequence transmitted by the source computer 11(s) to determine whether it failed to receive a particular message.

The use of "NACK" messages by a destination computer 11(d) to request retransmission of messages which it did not receive is generally efficient in connection with unicast messages, since there is only one destination computer 11(d) which may generate a "NACK" message if a message is not received. In that case, the source computer 11(s) will only need to process one "NACK" message for each non-received message. A problem can arise, however, if a number of destination computers 11(d) do not receive a multicast message that is transmitted by a source computer 11(s), and generate respective "NACK" messages for transmission to the source computer 11(s). In that case, the source computer 11(s) would need to process each of the "NACK" messages that it receives, which can significantly negatively affect other processing operations that are to be performed by the source computer 11(s). A multicast message delivery error recovery tree can assist in reducing the number of "NACK" messages which are transmitted to the source computer 11(s) of a multicast message, which can serve to reduce the negative affect on processing thereby which might otherwise arise, particularly in a wide-area network in which large numbers of computers may be destinations of a multicast message. The invention provides an arrangement for efficiently organizing the computers 11(n) in the local area network into a multicast message delivery error recovery tree.

Figure 2:
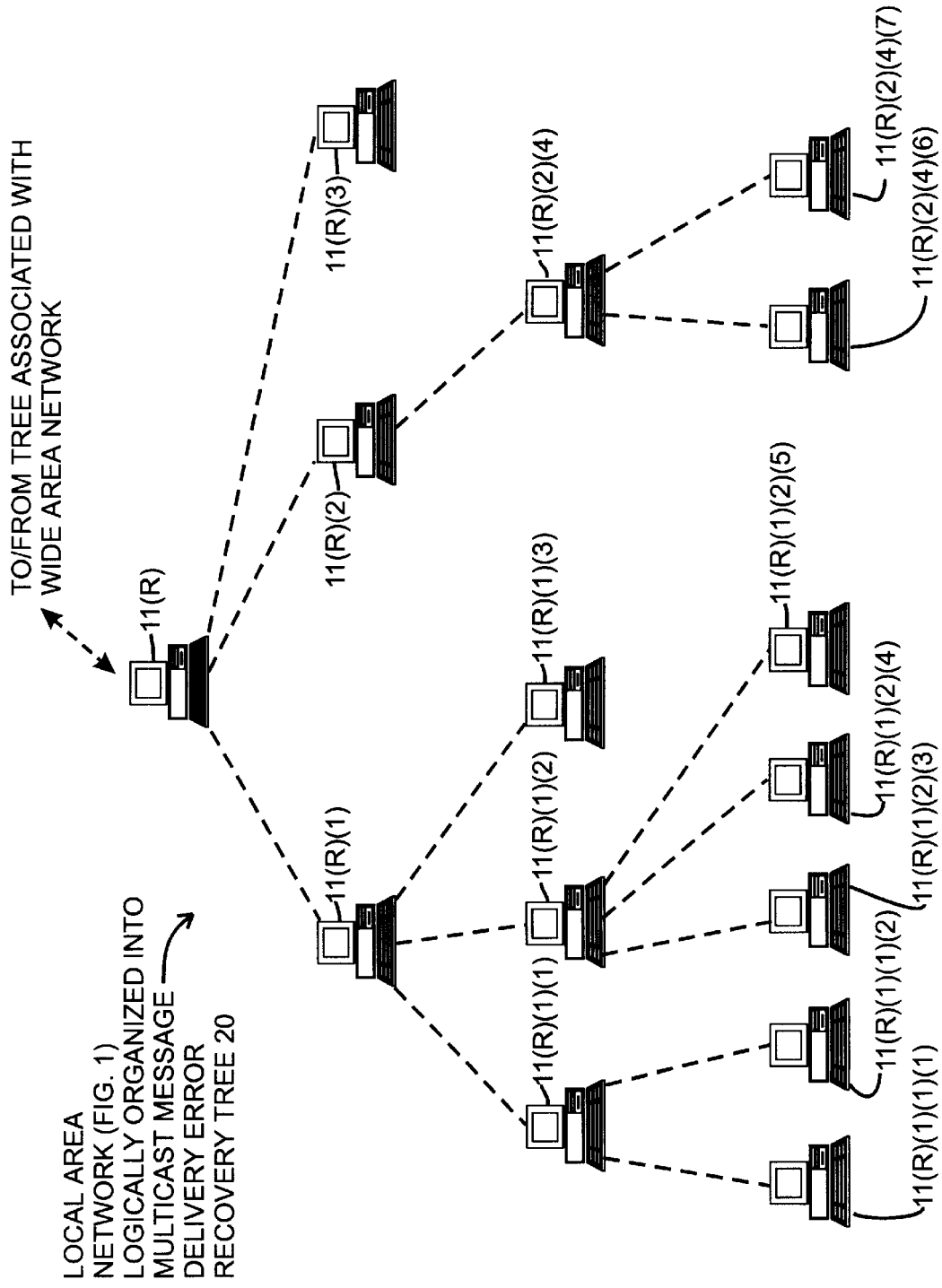
FIG. 2 is a logical diagram of the local area network depicted in FIG. 1, logically organized in an illustrative multicast message delivery error recovery tree.

Before proceeding further, it would be helpful to describe the logical organization of a multicast message delivery error recovery tree in local area network 10. An illustrative example of a multicast message delivery error recovery tree, identified by reference numeral 20, is depicted in FIG. 2. Generally, in the illustrative multicast message delivery error recovery tree 20, the computers 11(n) comprising local area network 10 are "logically interconnected" (as will be described below) in a manner represented by the dashed lines interconnecting the various computers depicted in FIG. 2. In the illustrative multicast message delivery error recovery tree 20:

(i) one of the computers 11(R) forms a root node, which forms the highest level in the tree 20, (ii) others of the computers 11(R)(1) through 11(R)(A) (generally identified by reference numeral 11(R)(a), "a" being an index between "1" and "A," inclusive) all of which are "logically connected" (as will be described below) to the root node 11(R), form a first lower level in the tree 20 below the root node, (iii) others of the computers 11(R)(a)(1) through 11(R)(a)(B) (generally identified by reference numeral 11(R)(a)(b), "b" being an index between "1" and "B," inclusive), all of which are logically connected to a computer 11(R)(a) in the first level, form a second lower level in the tree 20 below the root node, and so on, until finally the rest of the computers 11(R)(a)(b) . . . (1) through 11(R)(a)(b) . . . (L) (generally identified by reference numeral 11(R)(a)(b) . . . (1), "1" being an index between "1" and "L," inclusive) form respective "leaf nodes" in the tree 20. (It will be appreciated that the computers 11(R), 11(R)(a), 11(R)(a)(b), etc, comprise respective ones of computers 11(n) depicted in FIG. 1, the indices "(n)" used in the reference numerals in FIG. 1 being changed in FIG. 2 to depict the organization of the computers 11(n) in FIG. 1 into the multicast message delivery error recovery tree 20.) Generally, (a) a computer that is in a level in the tree below the root node, or that forms a leaf node is logically connected to one computer in a higher level, which computer will be referred to as its "parent" in the multicast message delivery error recovery tree 20, and (b) a computer that is in a level that is above the lowest level in the tree is logically connected to one or more computers in the next lower level and/or to one or more computers that form respective leaf node(s) in the multicast message delivery error recovery tree 20, which will be referred to as the computer's "children."

Thus, with reference to the illustrative multicast message delivery error recovery tree 20 depicted in FIG. 2, computer 11(R), which forms the root node in the tree, is the parent of the computers 11(R)(1) and 11(R)(2), which form the second level in the tree, and additionally is the parent of computer 11(R)(3) which forms a leaf node in the tree 20.

Contrariwise, each computer 11(R)(1), 11(R)(2) and 11(R)(3) is a "child" of the computer 11(R) in the tree 20. Similarly, computer 11(R)(1) is the parent of computers 11(R)(1)(1) and 11(R)(1)(2) (which comprise nodes in the third level of tree 20) and 11(R)(1)(3) (which is a leaf node in tree 20), and each computer 11(R)(1)(1), 11(R)(1)(2) and 11(R)(1)(3) is a child of computer 11(R)(1). It will be appreciated that a computer other than the computer that forms the root node will have one parent, but it can have one or more than one children.

Generally, a computer that forms a leaf node in the multicast tree is logically connected to a computer in a higher level, but no computer in any lower level and no computer forming a leaf node logically connects to it (that is, the computer 11(R)(a)(b) . . . (1) that forms the leaf node). A computer 11(R)(a)(b) . . . (1) that forms a leaf node may connect to a computer at any level in the tree. It will be appreciated that the tree need not be balanced, that is, there may be different numbers of levels between the computer 11(R) which forms the root node, and the various computers 11(R)(a)(b) . . . (1) which form leaf nodes in the tree, and various non-leaf nodes comprising the tree 20 may have different numbers of children. Thus, for example, the number of levels between the computer 11(R) which forms the root node and a computer 11(R)(a)(b) . . . ($1_1$) which forms a leaf node, may differ from the number of levels between the computer 11(R) and another computer 11(R)(a)(b) . . . ($1_2$) which forms a leaf node, and so forth for all computers 11(1) which form leaf nodes. In each reference numeral 11(R)(a), 11(R)(a)(b), . . . 11(R)(a)(b) . . . (1), the sequence of values for indices "a," "b," . . . "1" define a logical path through the tree from the computer system 11(R) forming the root node, through a sequence of computers in successively lower levels to the computer identified by the respective reference numeral.

As noted above, the local area network 10 in which the multicast message delivery error recovery tree 20 is formed is part of a wide area network including a plurality of local area networks. In one embodiment, the multicast message delivery error recovery tree 20 depicted in FIG. 2 forms a sub-tree of a larger tree (not shown) as represented by the double-headed arrow associated with the legend "TO/FROM TREE ASSOCIATED WITH WIDE AREA NETWORK" in FIG. 2. In that case, although the computer 11(R) which forms the root node in the multicast message delivery error recovery tree 20 for local-area network 10 does not have a parent within the tree 20 organized as depicted in FIG. 2, it will have a parent in the larger tree. The parent, and computers in levels thereabove in the larger tree formed in the wide area network, may be in other local area networks in the wide area network. Alternatively or in addition, computers at higher levels in the tree formed in the wide area network may include computers in the local area network 10. In that case, a computer in the local area network 10 may be at a node at a lower level or comprise a leaf node 11(R)(a)(b) . . . (1) in the multicast message delivery error recovery tree 20, and may in addition comprise a node at a higher level than the computer 11(R) that forms the root node in the multicast message delivery error recovery tree 20 formed in the local area network 10.

The multicast message delivery error recovery tree 20 is used to provide a mechanism whereby, in the event that one or more of the computers in the network 10 fail to receive a multicast message from the computer which forms the root node in the tree formed in the wide area network, of which the local area network 10 is a part, those computers can efficiently request the retransmission of a copy of the multicast message thereto. For example, the tree 20 provides a mechanism whereby a computer, such as computer 11(R)(1)(1)(1), in the network 10, if it fails to receive a multicast message from another computer as source computer 11(s), instead of generating a "NACK" message for transfer to the source computer 11(s) requesting re-transmission of a copy of the multicast message, can generate a "NACK" message for transfer over communication link 13 to its parent computer 11(R)(1)(1) in multicast message delivery error recovery tree 20, the "NACK" message requesting it (that is, the parent computer 11(R)(1)(1)) to provide a copy of the multicast message to the child computer 11(R)(1)(1)(1). If that parent computer 11(R)(1)(1) has a copy of the multicast message, it (that is, parent computer 11(R)(1)(1)) will transmit the multicast message over the communication link 13. The child computer 11(R)(1)(1)(1) which requested the copy of the multicast message can then receive the multicast message transmitted by the parent computer 11(R)(1)(1). It will be appreciated that the other computers 11(n) in the local area network 10 can also receive the multicast message and use it if they had not previously received it; the other computers 11(n) in the local area network, that is, the computers which previously received the message, can ignore the message. Preferably, the parent computer 11(R)(1)(1), when it transmits the multicast message, will transmit the message with a time to live value that will limit its transmission to the local area network 10, so that the message is not transmitted to other portions of the wide area network which may have received the multicast message.

On the other hand, if the computer 11(R)(1)(1) does not have a copy of the multicast message, it will generate a "NACK" message for transfer over communication link 13 to its parent computer 11(R)(1) requesting a copy therefrom. If that computer 11(R)(1) has a copy of the multicast message, it (that is, the computer 11(R)(1)) will transmit the multicast message over the communication link 13 as described above, to provide the multicast message to its child and grandchild computers 11(R)(1)(1) and 11(R)(1)(1)(1), along with any other computers 11(n) which had not previously received the message. Similarly, if the computer 11(R)(1) does not have a copy of the multicast message, it, in turn, will generate a "NACK" message for transfer over communication link 13 to its parent, namely, the computer 11(R) which forms the root node in the multicast tree 20, requesting a copy therefrom. If the computer 11(R) has a copy of the requested multicast message, it will transmit the multicast message over the communication link 13 as described above.

However, if, after receiving the request from the computer 11(R)(1), the computer 11(R) which forms the root node in the multicast message delivery error recovery tree 20 determines that it does not have a copy of the requested message, it will attempt to obtain a copy. As noted above, in one embodiment, in which the local area network 10 forms part of a wide area network, and in which the multicast message delivery error recovery tree 20 forms a sub-tree of a larger tree formed in the wide area network, if the computer 11(R) which forms the root node in the multicast message delivery error recovery tree 20 does not have a copy of the message, it will generate a "NACK" message for transfer to a computer in the wide area network that is its parent in the larger tree. This process, in which each computer which receives such a "NACK" message from its child in the tree determines whether it has a copy of the requested message, and (i) if so, transmits the multicast message, but (ii) if not generates a "NACK" message for transfer to its parent, will continue until a "NACK" message reaches the computer comprising root node in the tree formed in the wide area network, which is the source computer 11(s) for the message.

It will be appreciated that the use of the multicast message delivery error recovery tree 20, and associated tree formed in the wide area network, can serve to substantially reduce the number of "NACK" messages that are transmitted to the source computer 11(s) for a multicast message. If a multicast message is not received by a particular destination computer, it is frequently the case that a large number of destination computers 11(d) will not receive the multicast message, not just a single destination computer. In that case, the destination computers which fail to receive the multicast message will generate only one "NACK" message. Thus, for example, if a computer which forms a node in the multicast message delivery error recovery tree 20 has already generated a "NACK" message requesting a copy of a particular multicast message for transmission to its parent in the tree 20, either because it itself failed to receive the multicast message or in response to receipt of a "NACK" message from one of its children requesting the multicast message, and it later receives a "NACK" message from another child requesting the same multicast message, it will not need to generate another "NACK" message for the same multicast message for transmission to its parent. In addition, the "NACK" messages that are generated by the destination computers 11(d) are generally not for transmission to the source computer 11(s) which generated the multicast message, but instead to their respective parents in the multicast message delivery error recovery tree 20, or to its parent the tree in the larger tree formed in the wide area network.

In addition, each computer forming a node in the multicast message delivery error recovery tree 20, or in the larger tree formed in the wide area network, will receive at most only a limited number of "NACK" messages, namely, at most a number corresponding to the number of its children in the respective tree. As will be described below, in connection with establishment of the multicast message delivery error recovery tree 20, each computer forming a node in the tree 20 can determine the maximum number of children it can accommodate during establishment of the tree 20. In any case, since none of the computers, including the source computer 11(s) for the multicast message and the computers forming nodes in the multicast message delivery error recovery tree 20, or the larger tree formed in the wide area network, receives an unduly large number of "NACK" messages in the event of a failure to receive a multicast message, processing of the "NACK" messages will not unduly negatively affect their other processing operations.

In one embodiment, the portion of the larger tree above the multicast message delivery error recovery tree 20 established for the local area network 10 will be predetermined by, for example, a system administrator, and one computer in the wide area network will be identified as a parent for the computer 11(R) in the local area network 10 that is selected as the parent for the root node in the tree 20. However, the computers 11(n) in the local area network 10 themselves determine the logical organization of the multicast message delivery error recovery tree 20 for the local area network 10. Operations performed by the computers 11(n) in establishing the multicast message delivery error recovery tree 20 in the local area network 10 will be described below in connection with the flow chart depicted in FIG. 4. Generally, the computers 11(n) make use of three types of messages, namely, a node election message type, a node advertising message type, and a child solicitation message type. The establishment of a multicast message delivery error recovery tree 20 proceeds in a plurality of iterations, each iteration including two phases, namely, a node election phase and a child solicitation phase. In the first iteration, a computer is selected as a root node in the tree 20, and in each subsequent iteration, a number of additional computer(s) 11(n) will be added to the tree 20. In each iteration, the computers 11(n) use messages of the node election message type during the node selection phase and messages of the node advertisement message type during the child solicitation phase. The use of messages of the child solicitation message type will be described below.

FIG. 3A depicts structure of a node election message 30 used by computers 11(n) in one embodiment of the invention during the node election phase of each iteration. Generally, in each iteration, each of the computers 11(n) that can become a node in the multicast message delivery error recovery tree, referenced as "participating" in the iteration, multicast node election messages that identify its suitability (as will be described below) of becoming a node in the tree. The node election messages also identify a number of nodes that will be selected during the iteration. The computers 11(n) essentially self-select themselves as nodes at the end of the iteration. With reference to FIG. 3A, node election message 30 includes a header portion 31 and a data portion 32. The header portion 31 contains message transfer protocol information, including a message type identifier, source and destination addresses, and a time to live value. The message type identifier in the header portion 31 identifies the message as being of the node election type, the source address identifies the particular computer 11(n) that generated and transmitted the node election message and the destination address identifies the multicast address for the computers 11(n) comprising the local area network 10. The time to live value is selected to ensure that the node election messages are transmitted only in the local area network.

The data portion 32 contains a number of fields that are used during the iteration in selecting the computers 11(n) that are to be nodes in the tree 20, including a priority field 33, a capacity field 34, a computer system identifier field 35, a number of nodes field 36 and an election interval field 37. The priority field 33, capacity field 34 and computer system identifier field 35 contain values that serve to rank the participating computers in their relative suitability to become a node during the iteration. In particular, priority field contains a priority value that identifies a relative priority for the computer 11(n) that generates the node election message to be a node. Illustrative priority values used in priority field 33 include, for example, a highest "must be" a node value, a relatively high "eager" to be a node value, and a relatively low "reluctantly would be" a node value. In addition, the lowest "leaf only" node value can be assigned to a computer 11(n) if it will only operate as a leaf in the multicast message delivery error recovery tree 20; in that case, the computer 11(n) will not participate in the node election phase of any iteration. The capacity field 37 contains a child capacity value that identifies the number of children the computer 11(n) can accommodate. The computer system identifier field 35 contains a computer system identifier that identifies the computer 11(n) in the local area network 10; in one embodiment, the computer system identifier comprises the network address for the computer 11(n).

The number of nodes field 36 contains a value that identifies the number of computers 11(n) that are to be selected as nodes during the iteration. Thus, in the first iteration, in which the computer to serve as the root node in the multicast message delivery error recovery tree 20 is selected, the value contained in the number of nodes field 36 will be "one." If a subsequent iteration is needed to select additional computers to operate as nodes in the multicast message delivery error recovery tree 20, the computer 11(R) previously selected as the root node in the tree 20 will provide a value identifying the number of computers 11(n) that are to be selected as nodes in the subsequent iteration. These operations will continue through each subsequent iteration.

Finally, the election interval field 37 identifies the time interval between transmissions of node election messages by the computer system which generates the respective message.

As noted above, the values in the priority field 33, capacity field 34 and computer system identifier field 35 are used to rank the participating computers 11(n) as to their relative suitability to be selected as nodes during the iteration. Generally, the ranking is based first on the priority value, so that those computers 11(n) which have the higher priority values will be deemed more suitable and those which have lower priority values will be deemed less suitable. As among computers 11(n) which have the same priority value, suitability is determined based on their respective capacity values, which identify the number of children that they can accommodate; that is, computers 11(n) with higher capacity values will be deemed more suitable and computers 11(n) with lower capacity values will be deemed less suitable, within the ranking as determined by their priority values. Finally, as among computers 11(n) with the same priority and capacity values, the suitability ranking is determined based on their respective computer system identifiers. Each computer system identifier is unique, at least among computers 11(n) in the local area network, and the use of the computer system identifier value is selected, somewhat arbitrarily, as a means to provide rankings as among computers in the local area network 10 which have the same priority and capacity values.

It will be appreciated that, if the priority values, capacity values and computer system identifier values are all numerical values, with higher priority, capacity and computer system identifier values each being represented by a higher numerical value and lower priority, capacity and computer system identifier values each being represented by a lower numerical value, a computer can generate a unitary suitability value "S" as <PRI_VAL|CAP_VAL|CSID_VAL>, where "PRI_VAL" represents a field for the priority value, "CAP_VAL" represents a field for the capacity value, "CSID_VAL" represents a field for the computer system identifier value, and "51" represents the concatenation operation, with the respective fields used in the node election messages from all of the computers 11(n) having the same number of bits. Each computer 11(n) determines its suitability ranking in connection with the number of computers in the local area network 10 which have higher suitability values than the computer 11(n).

FIG. 3B depicts the structure of a node advertising message 40 used in one embodiment of the invention during the second phase of each iteration. In particular, the node advertising message 40 is used by computers 11(n) which have determined that they are nodes in the multicast message delivery error recovery tree 20 to notify other computers in the local area network 10 that they are available to have other computers logically connect to them as children in the tree 20. In that connection, the computer 11(n) that transmits the node advertising message 40 also provides some information to the other computers as to the status of the computer 11(n), which they (that is, the other computers) can use to determine whether they should logically connect to that computer 11(n).

With reference to FIG. 3B, node advertising message 40 includes a header portion 41 and a data portion 42. The header portion 41 contains message transfer protocol information, including a message type identifier and source and destination addresses, and a time to live value. The message type identifier in the header portion 41 identifies the message as being of the node advertising type, the source address identifies the particular computer 11(n) that generated and transmitted the node advertising message and the destination address identifies the multicast address. The time to live value is selected to ensure that the node advertising messages are transmitted only in the local area network.

The data portion 42 contains a number of fields that are used during the iteration in notifying the other computers in the local area network 10 as to the logical connection availability of the computer 11(n) that generates the message 40, including a priority field 43, a capacity field 44, a computer system identifier field 45, an advertising interval field 46, a number of children field 47, a connected field 48, a number of nodes field 49 and a status field 50. The priority field 43, capacity field 44 and computer system identifier field 45 contain priority, capacity and computer system identifier values that correspond to the respective values in fields 33, 34, and 35, respectively, of node election message 30 as described above. The advertising interval field 46 identifies the time interval between transmissions of a node advertising message 40 by the particular computer 11(n) that generates the node advertising message 40.

The number of children field 47 of node advertising message 40 contains a value that identifies the number of other computers to which the particular computer 11(n) is currently logically connected when it (that is, the particular computer 11(n)) transmits the node advertising message 40. A computer that receives a node advertising message 40 from the computer 11(n) can determine an excess capacity value for computer 11(n), which is a measure of the ability of the computer 11(n) to take on additional children, by determining the difference between the capacity value in field 44 and the number of children value in file 47. A computer may use the excess capacity value for several purposes, including determining whether it should attempt to logically connect as a child to a particular computer 11(n) based on its excess capacity in relation to the excess capacity values of computers which form other nodes in the multicast message delivery error recovery tree 20. Other uses of the excess capacity value will be described below.

The connected field 48 of node advertising message 40 contains a connected flag that, if set, indicates that the computer 11(n) that generates the node advertising message 40 is logically connected to multicast message delivery error recovery tree 20, and otherwise indicates that the computer is not logically connected to the tree 20. The number of nodes field 49 identifies the current number of nodes that have been selected for the tree 20. The status field 50 provides information as to the computer's status in the tree 20. In one embodiment the status field 50 normally has an "active" value, which indicates that the computer 11(n) that generates the node advertising message 40 is currently a node in the tree 20. However, as will be described below, the status field 50 can also have a "resigning" value, which indicates that the computer 11(n) that generates the node advertising message 40 is a node in tree 20, but is in the process of resigning as a node and converting to a leaf. If status field 50 of the node advertising message 40 transmitted by a computer 11(n) indicates the "resigning" status, its children in the tree will need to attempt to logically connect to other computers that are nodes in the tree.

As noted above, establishment of multicast message delivery error recovery tree 20 proceeds in a plurality of iterations. Generally, the first iteration will start when at least one of the computers 11(*n*) of the local area network 10 has been powered on and initialized. After a computer 11(*n*) has been initialized, if it is associated with a priority value that would allow it to be a node in the multicast message delivery error recovery tree 20, that is, if it is associated with a priority value other than "leaf only," it will begin periodically transmitting node election messages 30. If, within a selected time interval after beginning transmitting node election messages 30, the computer 11(*n*) does not receive a node election message 30 from other computers in the network, it (that is, computer 11(*n*)) will determine that it is "elected" as a node in the multicast message delivery error recovery tree 20, and stop transmitting node election messages 30. Since the computer 11(*n*) comprising the elected node is, at this point, the only node in the tree 20, it (that is, the computer 11(*n*)) will comprise the root node 11(R) in the tree 20. After the computer 11(*n*) determines that it is the elected node, will begin transmitting node advertising messages 40 to notify other computers in the local area network 10 of its availability to accept children. If other computers in the local area network 10 that have been powered on and initialized, after receiving a node advertising message 40, they can communicate with the computer 11(*n*) to attempt to logically become children of the computer 11(*n*) in the tree 20. It will be appreciated that this may occur (that is, that the computer 11(*n*) does not receive any node election messages 30 from other computers in the local area network within the selected time interval) if there are no other computers in the network which have been powered on and initialized which can operate as a node in the multicast message delivery error recovery tree 20 for the local area network In addition, after being "elected" a node in the tree 20, the computer 11(*n*) can increment its priority value by a predetermined "elected node" increment value, the purpose for which will be described below.

On the other hand, if, within the selected time interval, the computer 11(*n*) receives a node election message 30 from at least one other computer 11(*n*') in the local area network 10, it will compare the suitability value (that is, as described above, the concatenation of the priority value, capacity value and computer system identifier value from fields 33, 34 and 35) from the received node election message to its own suitability value (that is, the concatenation of its priority value, capacity value and computer system identifier value) that it is providing in the node election messages 30 that it is transmitting. If the computer 11(*n*) determines that its suitability value is less than the suitability value in the received node election message, it will stop transmitting node election messages. On the other hand, if the computer 11(*n*) determines that its suitability value is greater than the suitability value in the received node election message, it will continue transmitting node election messages. The other computer 11(n') will perform similar operations, so that, if it determines that its suitability value is higher than that of computer 11(*n*), it will continue transmitting node election messages, but if it determines that its suitability value is lower than that of computer 11(*n*), it will stop transmitting node election messages.

Each computer in the local area network with a priority level above "leaf only" will perform similar operations. At the end of the selected time interval, one of the computers, if it is still transmitting node election messages, then it has not received a node election message from a computer in the local area network which has a higher suitability value, and so it (that is, the still-transmitting computer) will determine that it is "elected" a node, in this case the root node, in the tree 20, and therefore will constitute the computer 11(R) (reference FIG. 2) in the tree 20. After computer 11(R) determines that it is the elected node, it will stop transmitting node election messages 30 and begin transmitting node advertising messages 40 to notify other computers in the local area network 10 of its availability to accept children. Other computers in the local area network 10 that have been powered on and initialized can, after receiving a node advertising message 40, communicate with the computer 11(R) to attempt to become children of the elected computer in the tree 20. In addition, the computer 11(R) can increment its priority value by the predetermined "elected node" increment value.

If the computer 11(R) that forms the root node of the multicast message delivery error recovery tree 20 determines, during the communications with the other computers in the local area network 10, that it has the capacity to accommodate all of the other computers as leaves, it can logically connect to the other computers at that point. On the other hand, if the computer 11(R) determines that more computers are requesting to become children thereof than it can accommodate, it (that is, the computer 11(R)) can initiate a second iteration in the tree establishment process, to enable election of additional nodes for the multicast message delivery error recovery tree 20. It will be appreciated that the additional nodes will comprise one or more levels in the tree 20 below the root level. To initiate the second iteration, the computer 11(R) will resume transmitting node election messages 30. In this iteration, the node election messages 30 generated by the computer 11(R) will contain a number of nodes value in field 36 that is greater than one by an amount corresponding to the number of new nodes that are to be elected. In the node election messages generated by the computer 11(R), the priority value in field 33 will reflect the incremented priority value, that is, its original priority value incremented by the predetermined "elected node" increment value.

Each of the other computers in the local area network 10 which can also become nodes in the tree (that is, each computer other than computer 11(R) whose priority value is greater than "leaf only") will also resume transmitting node election messages 30. In this case, each of the other computers will use their own priority, capacity and computer system identifier values in fields 33 through 35 of their node election messages, but will use the number of nodes and election interval values from fields 36 and 37 in the node election messages 30 received from the computer 11(R) in node election messages that they transmit. While transmitting node election messages, each of the computers will also receive node election messages from the other computers and will compare the suitability values therefrom with their own suitability values. If a computer that is transmitting node election messages 30, determines that it has received node election messages 30 with higher suitability values than its (that is, the computer's) suitability value, from a number of other computers corresponding to the number of nodes value in field 36, it (that is, the computer) will stop sending node election messages 30. Until that occurs, the computer will continue transmitting node election messages until the end of the selected time interval. The number of computers which are continuing to transmit node selection messages 30 at the end of the selected time interval will correspond to the number of nodes specified in the number of nodes field 36, and so the computers that are transmitting node election messages 30 at the end of the selected time interval will constitute the set of computers that are elected to be nodes in the tree 20, including the root node.

It will be appreciated that the computer 11(R) that was elected the root node during the previous iteration may, but need not, have the highest suitability value (even with the priority value incremented by the predetermined "elected node" increment value) as among the elected nodes since one or more computers associated with higher suitability values than the computer 11(R) may have been powered on and initialized and begun transmitting node election messages. If the computer 11(R) that was elected as the root node during the previous iteration has a priority level, as incremented by the "elected node" increment value, that is higher than the other computers, then it will remain the root node. However, if another computer has a priority level that is sufficiently high that its suitability value is higher than the suitability of computer 11(R), the other computer will be elected root node during the current iteration. Indeed, if sufficient numbers of newly-transmitting computers have higher suitability values than the previously elected computer 11(R), that computer 11(R) may be "de-elected," that is, it may not be among the elected nodes for the iteration. In that case, the computer with the highest suitability value will be elected as the new root node 11(R) for subsequent operations, and the other elected computers will form other portions, including (but not necessarily limited to) the second level in the tree 20. However, it will be appreciated that, by incrementing the priority level of computer 11(R) that was previously-elected the root node in the tree 20, by the "elected node" increment value, the previous election will be "sticky," that is, it will not be disturbed unless the priority level of the other computer(s) is or are sufficiently higher than the original, non-incremented, priority level of the computer 11(R) to warrant disturbing the previous election.

Thereafter, the elected computers will transmit node advertising messages 40, as in the first iteration, to notify other computers in the local area network 10 of their availability to accept children. The computers elected during the iteration, other than the computer 11(R) that forms the root node for the tree 20, will receive the node advertising messages 40 transmitted by the computer 11(R) and will communicate with it to become logically connected thereto, thereby to establish them as forming the second level of the tree. If a newly-elected node cannot logically connect to the computer 11(R), it may logically connect to another newly-elected computer to begin the third level in the tree. The other, non-elected computers will communicate with any of the elected computers to negotiate formation of logical connections therewith.

If the root node determines that additional nodes of the tree are required, it can repeat the operations through subsequent iterations. In each iteration, the computers newly-elected to form node(s) in the tree 20 will increment their priority values by the predetermined "elected node" value, and, if a previously-elected computer is "de-elected," it will reduce its priority value to the original priority value. These operations will continue until preferably all of the computers 11(n) in the local area network 10 form part of the multicast message delivery error recovery tree 20, either as nodes or leaves. In addition, the root node 11(R) will logically connect as a child to a node specified for the local area network in the tree for the wide area network. After the multicast message delivery error recovery tree 20 has been established, the computers 11(n) comprising nodes in the tree will continually transmit node advertising messages 40, so that newly-initialized computers can identify nodes in the multicast message delivery error recovery tree 20 to which they may logically connect.

As noted above, a computer 11(n) in the local area network, after it is powered on and initialized, if it has a priority value that is other than "leaf only," will begin transmitting node election messages. If a multicast message delivery error recovery tree 20, or any portion thereof established as described above, already exists, the computers 11(n) will repeat the tree-establishment operations as described above. In those operations, the computers 11(n) which form nodes in the tree will use their priority values, as incremented by the "elected node" increment value, so that the tree 20 will not be disturbed during the new tree-establishment operations unless the newly-initialized computer has a sufficiently high priority value. If the newly-initialized computer has a priority value that is higher than the priority value associated with the computer 11(R) forming the root node for the tree 20, it (that is, the newly-initialized computer) will become the new root node for the tree. In that case, the computer 11(R') forming the new root node will logically connect as a child to a node specified for the local area network in the tree for the wide area network, and the computer 11(R) will logically connect to the computer 11(R') forming the new root node.

In addition, after the multicast message delivery error recovery tree 20 has been established in the local area network, the computers 11(n) will periodically repeat the election process. In that operation, any of the computers 11(n), other than a computer whose priority level is "leaf only," can transmit a node election message. The node election message transmitted by a computer 11(n) will include computer's suitability value, including its priority level either as incremented by the "elected node" increment value if the computer currently forms a node in the tree 20, or not incremented if the computer does not form a node in the tree 20. When other computers receive the node election message, if they have not themselves already initiated resuming transmission of respective node election messages, will resume transmission, and the node election process as described above will be repeated.

In one embodiment, after the multicast message delivery error recovery tree 20 has been established, the computers 11(n) that form nodes in the tree 20 attempt to optimize the tree. In that case, the computer $11(n_{LSV})$ that forms the node in the tree 20 with the lowest suitability value will determine whether it should continue operating as a node, or enable any children logically connected thereto to logically connect to computers that form other nodes in the tree. To accomplish that, the computer $11(n_{LSV})$ will determine whether excess capacity of all of the other computers forming nodes in the tree 20, is greater than or equal to the number of its children. In that case, the computer $11(n_{LSV})$ will transmit node advertising messages 40 that identify its status as "resigning." When the children of computer $11(n_{LSV})$ receive such node advertising messages, they will attempt to logically connect to computers that form the other nodes in the tree 20. After each such child logically connects to another computer, it will sever the logical connection with the computer $11(n_{LSV})$, and the computer $11(n_{LSV})$ can reduce the number of children value in the node advertising messages transmitted thereby. Between the time at which the child has logically connected to the other computer and the time at which it (that is, the child) has severed the logical connection with the computer $11(n_{LSV})$, it (that is, the child) will effectively be connected to both computers, and may transmit "NACK" messages to either or both computers.

This will ensure that all computers 11(n) are logically connected in the multicast message delivery error recovery tree 20. After all of the children of computer 11($n_{LSV}$) have severed their connections with computer 11($n_{LSV}$), that computer 11($n_{LSV}$) will comprise a leaf in the multicast message delivery error recovery tree 20 and will stop transmitting node advertising messages 40. These operations can be repeated through a plurality of iterations, for successive computers that are nodes with low suitability values.

With this background, the operations performed by a computer 11(n) in connection with the invention will be described in connection with FIGS. 4A through 4G. Generally, operations described in connection with FIG. 4 include several sequences, including (i) a node election message transmit sequence (FIGS. 4A and 4B) depicting operations performed by a node election message transmitter maintained by the computer 11(n) in connection with transmission of node election messages;

(ii) a node election message receive sequence (FIGS. 4C and 4D), depicting operations performed by a node election message receiver maintained by the computer 11(n) in connection with reception of node election messages, (iii) a tree organization sequence (FIG. 4E through 4G), depicting operations performed by a tree organization component maintained by the computer 11(n) in connection with logically connecting the computer 11(n) to a respective parent and children as appropriate which the computer 11(n) performs during an iteration, as described above.

As described above, a computer 11(n) will begin transmitting node election messages 30 either (i) after being powered up and initialized, (ii) a selected time period after a multicast message delivery error recovery tree 20 was previously established, or (iii) in response to receipt of a node election message from another computer, for a particular node election message time period. Thus, with reference to FIG. 4A, the computer 11(n) will, after being powered up and initialized (step 100), initially determine whether it has a priority level greater than "leaf only" (step 101). If the computer 11(n) makes a negative determination in step 101, that is, if it has a priority level of "leaf only," it will operate only as a leaf in a multicast message delivery error recovery tree 20 established for local area network 10. In that case, the computer 11(n) can wait for a node advertising message 40 from a computer that forms a node in a multicast message delivery error recovery tree 20, or it can begin transmitting child solicitation messages to enable computers that form nodes in a tree 20 to transmit node advertising messages 40.

On the other hand, if the computer 11(n) makes a positive determination in step 101, that is, if it has a priority level above "leaf only," it can operate as a node in a multicast message delivery error recovery tree 20 established in local area network 10. In that case, computer 11(n) will proceed to a series of steps to initiate transmission of node election messages 30. In that operation, the computer 11(n) will establish and initialize a node election message period timer (step 102) to be used to time the time period over which the computer 11(n) will transmit node election messages. In addition, the computer 11(n) will establish and initialize a number of nodes store (step 103), which stores a number of nodes value that will be used in the node election messages, and a node counter (step 104) that will be used to count the number of computers 11(n) from which it receives node election messages 30 with higher suitability values than its own suitability value. Initially the node counter will be set to a value of "zero." Following step 104, the computer 11(n) will determine whether the number of nodes value stored in the number of nodes store is higher than the value provided by the node counter (step 105).

If the computer 11(n) makes a positive determination in step 105, it will transmit a node election message including its priority, capacity and computer system identifier values in fields 33, 34 and 35, the number of nodes value from the number of nodes store in field 36, and the election interval value in field 37 (step 106). Following step 106, computer 11(n) will establish and initialize a node election message transmission interval timer to time the interval between transmission of node election messages, which will initially be set to a default value established for the computer 11(n) (step 107). When the computer 11(n) determines that the node election message transmission interval timer established in step 107 has timed out (step 108), if it determines that the node election message period timer has not timed out (step 109), the computer 11(n) will return to step 104 to determine whether to transmit another node election message 30. It will be appreciated that the computer 11(n) will repeat steps 104 through 109 until it determines (i) in step 105 that the value provided by node counter is greater than or equal to the number of nodes value, or (ii) in step 108 that the node election message period timer has timed out.

If the computer 11(n) determines in step 105 that the value provided by node counter is greater than or equal to the number of nodes value, then it has received node election messages from a number of computers in the local area network whose suitability values are greater than the suitability value of computer 11(n) corresponding to the number of nodes to be established in the multicast message delivery error recovery tree 20, and so it (that is, computer 11(n)) can stop transmitting node election messages 30.

If the computer 11(n) receives a node election message 30 from another computer 11(n') in the local area network 10 (step 120, FIG. 4C), it will initially determine whether it (that is, the computer 11(n)) is currently also transmitting node election messages (step 121). If the computer 11(n) makes a negative determination in step 121, that is, if it determines that it is not currently transmitting node election messages, if its priority level is greater than "leaf only," the computer will start transmitting node election messages as described above in connection with FIGS. 4A and 4B (step 122). In addition, the computer 11(n) will determine whether the number of nodes value in field 36 of the received message is larger than the number of nodes value in its number of nodes store (step 123). If the computer 11(n) makes a positive determination in step 123, that is, if it determines that the number of nodes value in field 36 of the received message is larger than the number of nodes value in its number of nodes store, then the computer 11(n') from which the node election message 30 was received forms a part of a previously-established multicast message delivery error recovery tree 20 that include a plurality of nodes. In that case, the computer 11(n) will increase the number of nodes value in its number of nodes store (step 124) and adjust its node election message period time interval to be used when the node election message transmission interval timer is next established in step 107 (step 125) for use during transmission of node election messages 30. In addition, the computer 11(n) will determine whether the suitability value of the computer 11(n') from which the message was received is greater than its suitability value (step 126). If the computer 11(n) makes a positive determination in step 126, then it determines whether it previously received a node election message 30 from computer 11(n') during the node election message transmission interval (step 127) and, if so, will increment the node counter used to control node election message transmission (step 128).

Figure 4A:
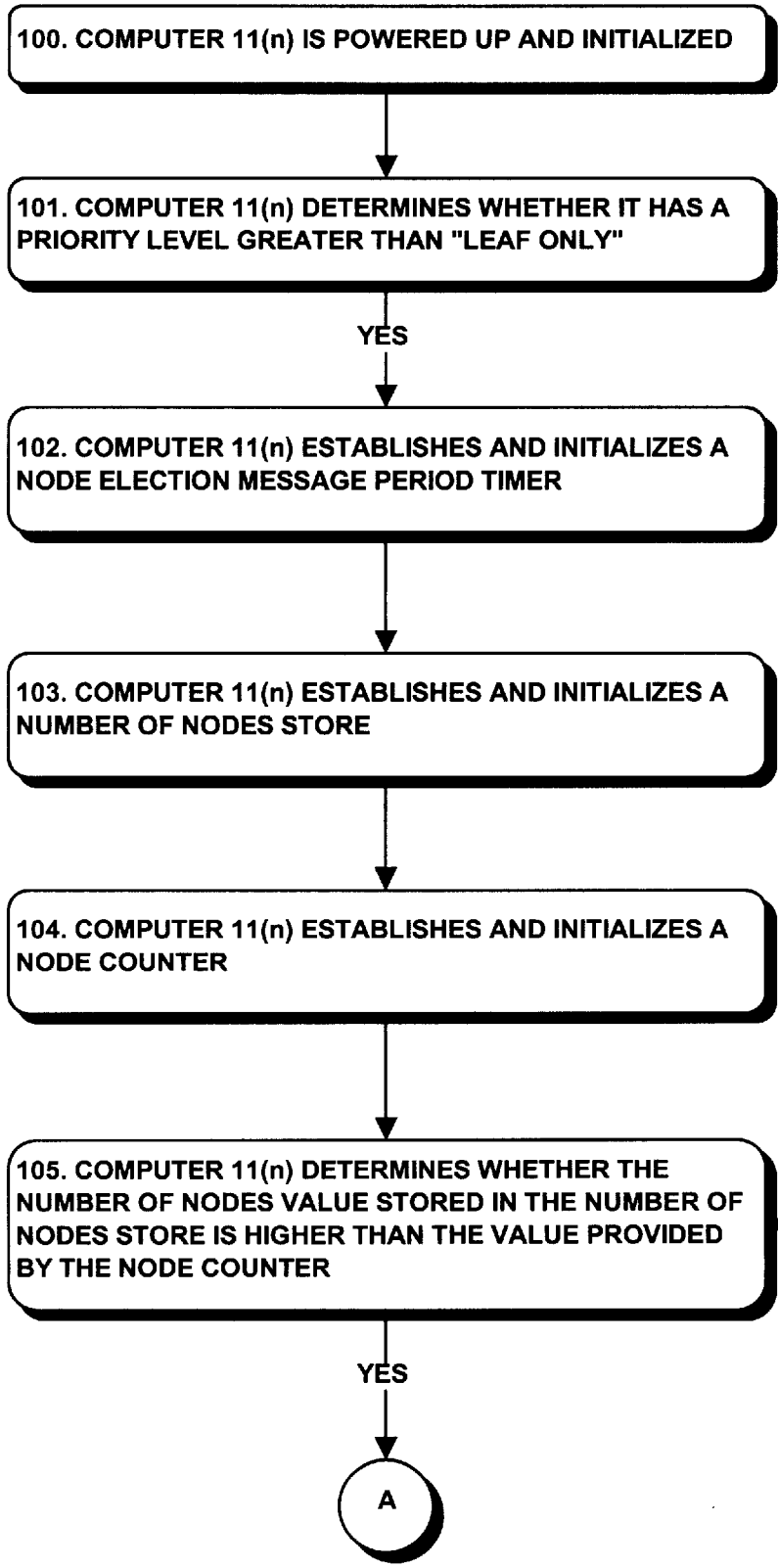
FIGS. 4A and 4B together comprise a flow chart depicting operations during anode election message receive sequence, during which node election messages are transmitted by the computers.
Figure 4B:
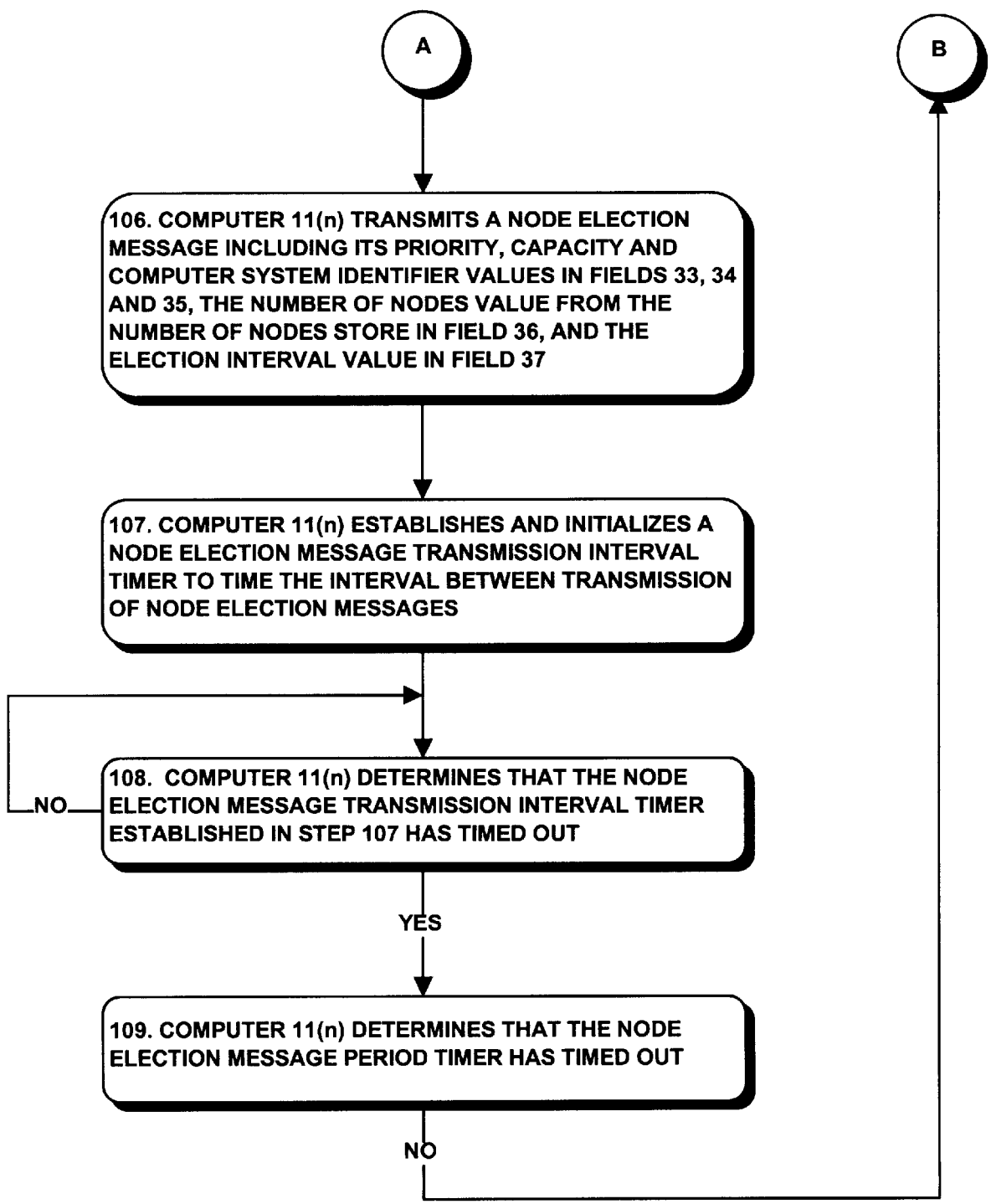
Figure 4C:
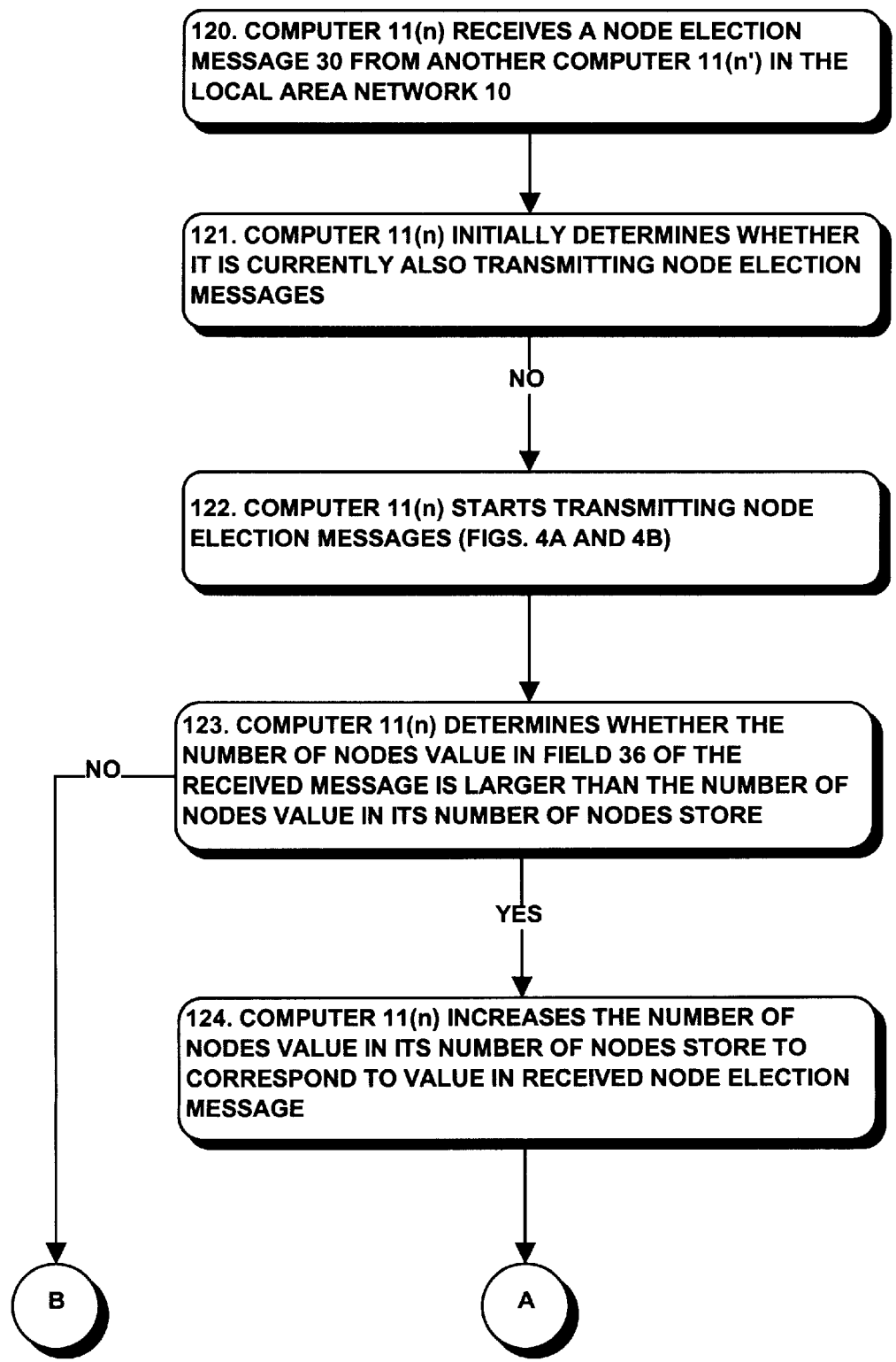
FIGS. 4C and 4D together comprise a flow chart depicting operations during the node election message receive sequence in connection with reception of node election messages by the computers.
Figure 4D:
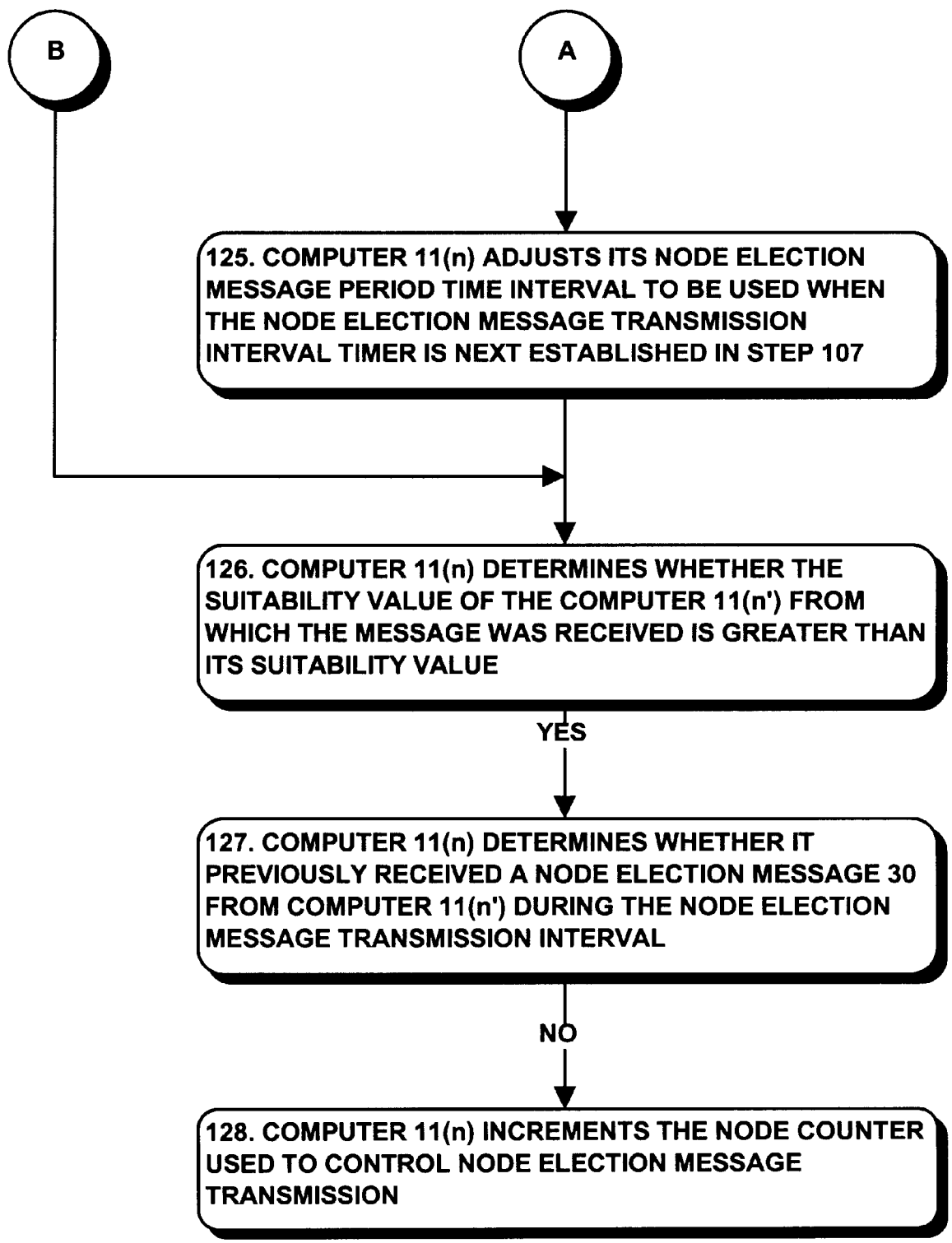
Figure 4E:
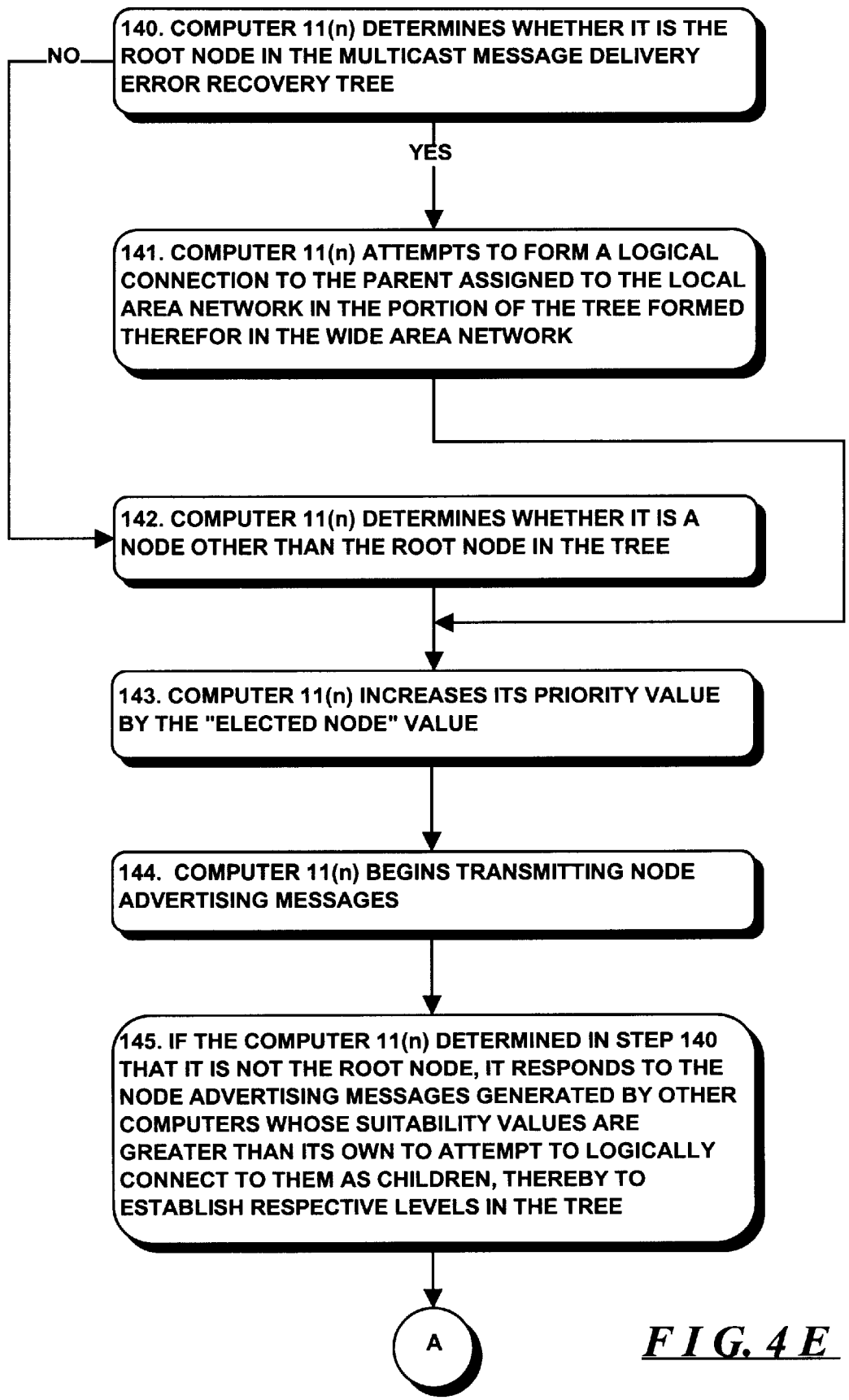
FIGS. 4E, 4F and 4G together comprise a flow chart depicting operations during a tree organization sequence, depicting operations performed by a tree organization components maintained by respective computers in connection with logically connecting the respective computers to respective parents and children.
Figure 4F:
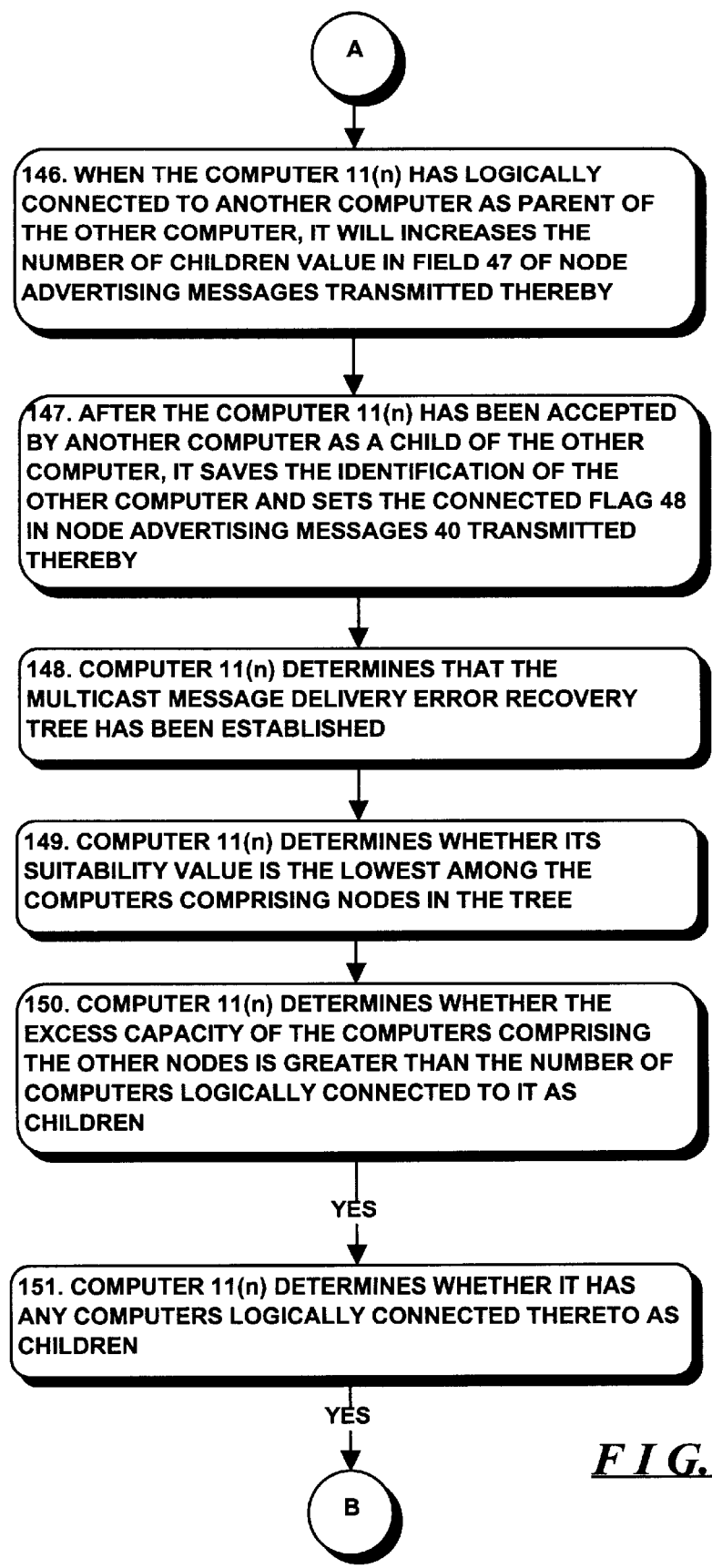
Figure 4G:
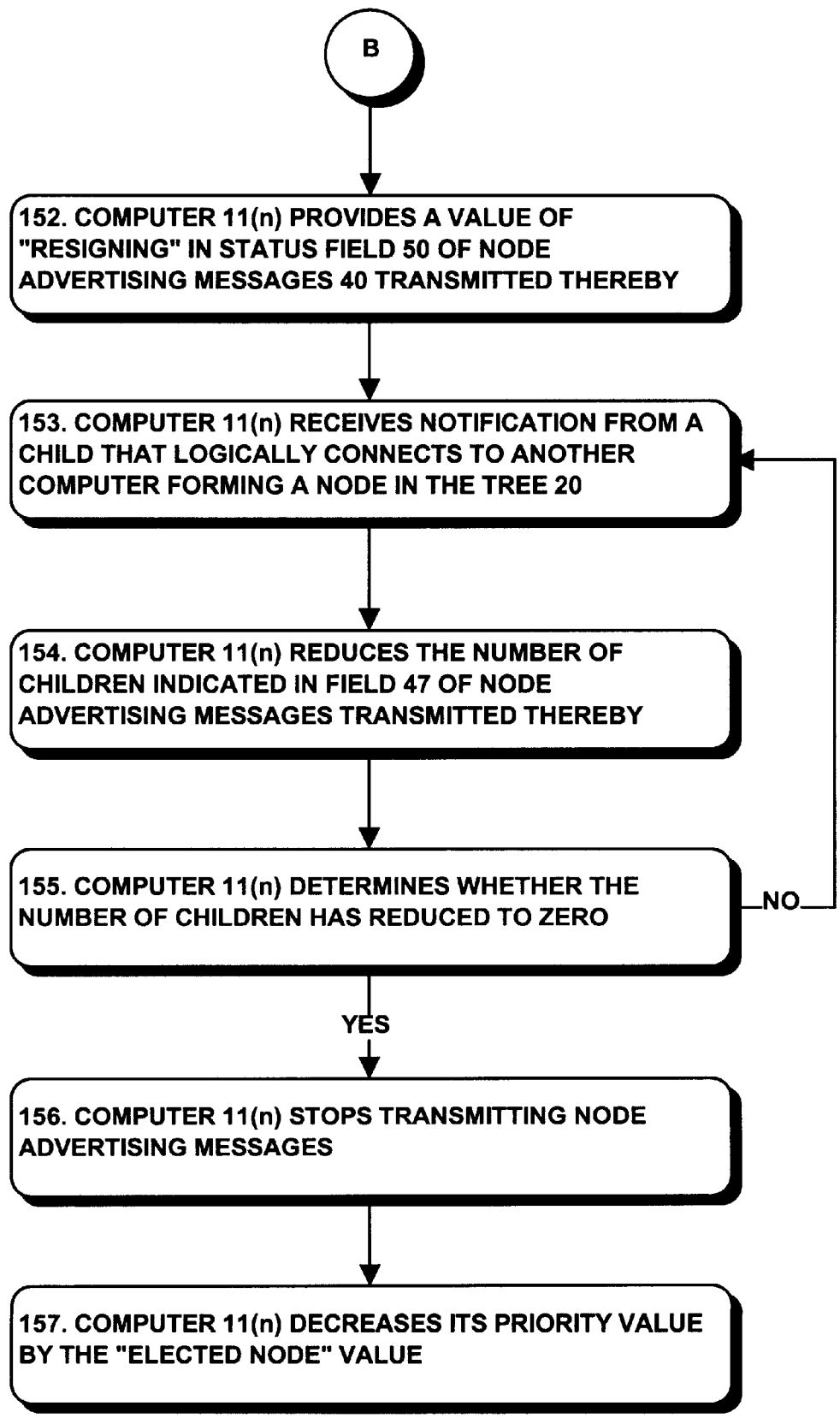

Returning to step 109 (FIG. 4B), after the node election message period timer has timed out, the computer 11(n) will perform operations, depicted in FIG. 4E, in connection with logically connecting to other computers as parent and/or children as appropriate. Thus, after the node election message period timer has timed out, the computer 11(n) will first determine whether it is the root node in the tree (step 140). In that operation, the computer 11(n) can determine whether it is the root node by determining whether the node counter has the value zero, which would indicate that it (that is, the computer 11(n) did not receive node election messages 30 from any other computer in the local area network with higher suitability values than that of computer 11(n). If the computer 11(n) makes a positive determination in step 140, it will attempt to form a logical connection to the parent assigned to the local area network in the portion of the tree formed therefor in the wide area network (step 141).

On the other hand, if the computer 11(n) makes a negative determination in step 140, it will determine whether it is a node other than the root node in the multicast message delivery error recovery tree 20. In that operation, the computer 11(n) can determine whether the number of nodes value stored in the number of nodes store is higher than the value provided by the node counter (step 142). If the computer 11(n) makes a positive determination in step 142, then it will form a node in the tree; on the other hand, if the computer 11(n) makes a negative determination in step 140, then it received node election messages 30 from at least a number of other computers in the local area network 10 corresponding to the number of nodes value identifying the number of nodes to be elected.

Following step 141, or step 142 if a positive determination is made in that step, the computer 11(n) will first increase its priority value by the "elected node" value (step 143). Thereafter, the computer 11(n) will begin transmitting node advertising messages to identify the availability of the computer 11(n) to logically connect to other computers as children (step 144). In addition, if the computer 11(n) determined in step 140 that it is not the root node, it will respond to the node advertising messages generated by other computers which have priority, capacity and computer system identifier values in fields 43-45 which define suitability values greater than its own to attempt to logically connect to them as children, thereby to establish respective levels in the tree 20 (step 145). After the computer 11(n) has logically connected to another computer as parent of the other computer, it will increase the number of children value in field 47 of node advertising messages transmitted thereby (step 146). On the other hand, after the computer 11(n) has been accepted by another computer as a child of the other computer, it will be logically connected to that other computer and can save the identification of the other computer for use in sending "NACK" messages, and set the connected flag 48 in node advertising messages 40 transmitted thereby (step 147).

After the computer 11(n) determines that the multicast message delivery error recovery tree 20 has been established (step 148), it will determine whether its suitability value is the lowest among the computers elected nodes in the tree (step 149). The computer 11(n) can do that by, for example, determining whether the value provided by its node counter corresponds to the number of nodes value in field 49 of the node advertising messages 40 transmitted by the computers comprising nodes in the tree 20. If the computer 11(n) makes a positive determination in step 149, it will determine whether the excess capacity, as described above, of the computers comprising the other nodes is greater than the number of computers logically connected to it as children (step 150). If the computer 11(n) makes a positive determination in step 150, if it has any computers logically connected thereto as children (step 151) it will provide a value of "resigning" in the status field 50 of node advertising messages 40 transmitted thereby to enable its children to attempt to logically connect to other computers forming nodes in the tree 20 (step 152). As the computer 11(n) receives notification from each child that logically connects to another computer forming a node in the tree 20 (step 153), it will reduce the number of children indicated in field 47 of node advertising messages transmitted thereby (step 154), and, after it determines that the number of children has reduced to zero (step 155), it will stop transmitting node advertising messages (step 156) and decrease its priority value by the "elected node" value (step 157).

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A method of logically organizing, in a digital data network comprising a plurality of devices interconnected by a communication link, the devices into a tree structure, each of the devices having an associated suitability value, the method comprising:

A. a node election step in which at least one of the devices is enabled to broadcast, over the communication link, at least one node election message including the respective device's suitability value, any devices broadcasting node election messages also being enabled to receive from the communication link any node election messages broadcast by other devices and to determine whether it is elected a node in the tree structure in connection with a comparison between its suitability value and suitability values in any received node election messages; and B. a tree establishment step in which at least one device which is elected a node in the tree structure is enabled to communicate with at least one other device to facilitate the other device becoming a child of the device that is elected a node in the tree.

2. A method as defined in claim 1 in which the node election step and the tree establishment step are performed in at least one iteration, in said at least one iteration, during the node election step one device being elected a node, as a root node, in the tree structure.

3. A method as defined in claim 2 in which the node election step and the tree establishment step are performed in a series of iterations, in a first iteration the root node being elected during the node election step, and each subsequent iteration at least one other device being elected as a node in the tree structure.

4. A method as defined in claim 3 in which the at least one other device elected as a node in the tree structure, during the tree establishment step of at least one of said iterations, being enabled to communicate with the device elected as root node to facilitate becoming a child thereof.

5. A method as defined in claim 3 in which the device elected as the root node is enabled to determine the number of additional nodes to be elected during each subsequent iteration.

6. A method as defined in claim 5 in which the device elected as the root node transmits, in its at least one node election message transmitted during each iteration after the first iteration, a number of nodes value identifying the number of additional nodes to be elected during the respective iteration.

7. A method as defined in claim 6 in which each of the devices enabled to broadcast at least one node election message transmits, during each iteration after the first iteration, a number of nodes value corresponding to the number of nodes value transmitted by the device elected as the root node.

8. A method as defined in claim 1 in which each device is assigned a priority value, the respective device's suitability value being a function of its priority value.

9. A method as defined in claim 1 in which each device has an associated capacity value associated with a number of children that it can accommodate, the respective device's suitability value being a function of its priority value.

10. A method as defined in claim 1 in which said at least one device is enabled to begin broadcasting at least one node election message after it is initialized.

11. A method as defined in claim 1 in which said at least one device is enabled to broadcast a plurality of node election messages, the at least one device stopping broadcasting node election messages if it receives a node election message from another device having a higher suitability value than the suitability value associated with the at least one device.

12. A method as defined in claim 1 in which, during the tree establishment step the at least one device that is elected a node in the tree is enabled to broadcast a node advertising message over the communication link indicating that it is available as a node in the tree.

13. A method as defined in claim 12 in which the at least one device that is elected a node in the tree is enabled to broadcast a node advertising message in response to receipt of a child solicitation message transmitted by at least one other device.

14. A method as defined in claim 12 in which at least one other device, after receiving a node advertising message, communicates with the at least one device that is elected a node in the tree to facilitate becoming a child thereof.

15. A system for logically organizing devices, in a digital data network comprising a plurality of devices interconnected by a communication link, into a tree structure, each of the devices having an associated suitability value, the system comprising:

A. a node election element configured to enable at least one of the devices to broadcast, over the communication link, at least one node election message including the respective device's suitability value, and to enable any devices broadcasting node election messages to receive from the communication link any node election messages broadcast by other devices and to determine whether it is elected a node in the tree structure in connection with a comparison between its suitability value and suitability values in any received node election messages; and B. a tree establishment element configured to enable at least one device which is not elected a node in the tree structure to communicate with at least one device which is elected a node in the tree structure to facilitate becoming a child of the device that is elected a node in the tree.

16. A system as defined in claim 15 in which the node election element and the tree establishment element are configured to operate in at least one iteration, in said at least one iteration, during the node election step one device being elected a node, as a root node, in the tree structure.

17. A system as defined in claim 16 in which the node election element and the tree establishment element are configured to operate in a series of iterations, in a first iteration the root node being elected during the node election step, and each subsequent iteration at least one other device being elected as a node in the tree structure.

18. A system as defined in claim 17 in which the node election element is configured to enable at least one other device elected as a node in the tree structure, during the tree establishment step of at least one of said iterations, to communicate with the device elected as root node to facilitate becoming a child thereof.

19. A system as defined in claim 17 in which the node election element enables the device elected as the root node to determine the number of additional nodes to be elected during each subsequent iteration.

20. A system as defined in claim 19 in which the node election element enables the device elected as the root node to transmit, in its at least one node election message transmitted during each iteration after the first iteration, a number of nodes value identifying the number of additional nodes to be elected during the respective iteration.

21. A system as defined in claim 20 in which the node election element enables each of the devices to broadcast at least one node election message transmits, during each iteration after the first iteration, a number of nodes value corresponding to the number of nodes value transmitted by the device elected as the root node.

22. A system as defined in claim 15 in which each device is assigned a priority value, the respective device's suitability value being a function of its priority value.

23. A system as defined in claim 15 in which each device has an associated capacity value associated with a number of children that it can accommodate, the respective device's suitability value being a function of its priority value.

24. A system as defined in claim 15 in which said node election element enables at least one device to begin broadcasting at least one node election message after it is initialized.

25. A system as defined in claim 15 in which said node election element enables at least one device to broadcast a plurality of node election messages, and to stop broadcasting node election messages if it receives a node election message from another device having a higher suitability value than the suitability value associated with the at least one device.

26. A system as defined in claim 15 in which the tree establishment element enables the at least one device that is elected a node in the tree to broadcast a node advertising message over the communication link indicating that it is available as a node in the tree.

27. A system as defined in claim 26 in which the tree establishment element enables at least one device that is elected a node in the tree to broadcast a node advertising message in response to receipt of a child solicitation message transmitted by at least one other device.

28. A system as defined in claim 26 in which the tree establishment element enables at least one other device, after receiving a node advertising message, to communicate with the at least one device that is elected a node in the tree to facilitate becoming a child thereof.

29. A computer program product for use in connection with a computer, the computer program product enabling said computer to, in a digital data network comprising a plurality of computers interconnected by a communication link, organize themselves into a tree structure, each of the computers having an associated suitability value, the computer program product comprising a computer-readable medium having encoded thereon:

A. a node election module configured to enable at least one of the computers to broadcast, over the communication link, at least one node election message including the respective computer's suitability value, and to enable any computers broadcasting node election messages to receive from the communication link any node election messages broadcast by other computers and to determine whether it is elected a node in the tree structure in connection with a comparison between its suitability value and suitability values in any received node election messages; and B. a tree establishment module configured to enable at least one computer which is not elected a node in the tree structure to communicate with at least one computer which is elected a node in the tree structure to facilitate becoming a child of the computer that is elected a node in the tree.

30. A computer program product as defined in claim 29 in which the node election module and the tree establishment module are configured to operate in at least one iteration, in said at least one iteration, during the node election step one computer being elected a node, as a root node, in the tree structure.

31. A computer program product as defined in claim 30 in which the node election module and the tree establishment module are configured to operate in a series of iterations, in a first iteration the root node being elected during the node election step, and each subsequent iteration at least one other computer being elected as a node in the tree structure.

32. A computer program product as defined in claim 31 in which the node election module is configured to enable at least one other computer elected as a node in the tree structure, during the tree establishment step of at least one of said iterations, to communicate with the computer elected as root node to facilitate becoming a child thereof.

33. A computer program product as defined in claim 31 in which the node election module enables the computer elected as the root node to determine the number of additional nodes to be elected during each subsequent iteration.

34. A computer program product as defined in claim 33 in which the node election module enables the computer elected as the root node to transmit, in its at least one node election message transmitted during each iteration after the first iteration, a number of nodes value identifying the number of additional nodes to be elected during the respective iteration.

35. A computer program product as defined in claim 34 in which the node election module enables each of the computers to broadcast at least one node election message transmits, during each iteration after the first iteration, a number of nodes value corresponding to the number of nodes value transmitted by the computer elected as the root node.

36. A computer program product as defined in claim 29 in which each computer is assigned a priority value, the respective computer's suitability value being a function of its priority value.

37. A computer program product as defined in claim 29 in which each computer has an associated capacity value associated with a number of children that it can accommodate, the respective computer's suitability value being a function of its priority value.

38. A computer program product as defined in claim 29 in which said node election module enables at least one computer to begin broadcasting at least one node election message after it is initialized.

39. A computer program product as defined in claim 29 in which said node election module enables at least one computer to broadcast a plurality of node election messages, and to stop broadcasting node election messages if it receives a node election message from another computer having a higher suitability value than the suitability value associated with the at least one computer.

40. A computer program product as defined in claim 29 in which the tree establishment module enables the at least one computer that is elected a node in the tree to broadcast a node advertising message over the communication link indicating that it is available as a node in the tree.

41. A computer program product as defined in claim 40 in which the tree establishment module enables at least one computer that is elected a node in the tree to broadcast a node advertising message in response to receipt of a child solicitation message transmitted by at least one other computer.

42. A computer program product as defined in claim 40 in which the tree establishment module enables at least one other computer, after receiving a node advertising message, to communicates with the at least one computer that is elected a node in the tree to facilitate becoming a child thereof.

* * * * *